United States Patent
Lemmen et al.

(10) Patent No.: US 9,917,515 B2
(45) Date of Patent: Mar. 13, 2018

(54) CASCADABLE MODULAR 4-SWITCH EXTENDED COMMUTATION CELL

(71) Applicant: Technische Universiteit Eindhoven, Eindhoven (NL)

(72) Inventors: Erik Lemmen, Eindhoven (NL); Jorge Luiz Duarte, Eindhoven (NL)

(73) Assignee: Technische Universiteit Eindhoven, Eindhoven (NL)

( * ) Notice: Subject to any disclaimer, the term of this patent is extended or adjusted under 35 U.S.C. 154(b) by 0 days.

(21) Appl. No.: 14/935,059

(22) Filed: Nov. 6, 2015

(65) Prior Publication Data

US 2016/0064160 A1 Mar. 3, 2016

Related U.S. Application Data

(63) Continuation-in-part of application No. 14/749,255, filed on Jun. 24, 2015, now abandoned.

(60) Provisional application No. 62/016,294, filed on Jun. 24, 2014.

(51) Int. Cl.
*H02M 3/158* (2006.01)
(52) U.S. Cl.
CPC .................................. *H02M 3/158* (2013.01)
(58) Field of Classification Search
CPC ........... H02M 2003/071; H02M 7/493; H02M 7/537; H02M 7/797; H02M 7/81; H02M 3/155–3/1588
See application file for complete search history.

(56) References Cited

U.S. PATENT DOCUMENTS

| | | | | |
|---|---|---|---|---|
| 5,594,635 A * | 1/1997 | Gegner | ................. | H02M 3/158 363/124 |
| 6,005,788 A * | 12/1999 | Lipo | ....................... | H02M 7/49 363/71 |
| 8,288,896 B2 | 10/2012 | Flury | | |
| 8,553,435 B2 | 10/2013 | Harnefors et al. | | |
| 2005/0093526 A1* | 5/2005 | Notman | ............. | H02M 3/1582 323/282 |
| 2011/0280052 A1* | 11/2011 | Al-Haddad | ........... | H02M 7/483 363/84 |
| 2013/0207471 A1* | 8/2013 | Divan | ....................... | H02J 3/00 307/43 |

(Continued)

FOREIGN PATENT DOCUMENTS

| | | |
|---|---|---|
| EP | 2568591 | 3/2013 |
| EP | 2680428 | 1/2014 |
| WO | WO 2015/070347 | 5/2015 |

OTHER PUBLICATIONS

Busquets-Monge et al., "A novel bidirectional multilevel boost-buck DC-DC converter, 2009, IEEE".

(Continued)

*Primary Examiner* — Yusef Ahmed
(74) *Attorney, Agent, or Firm* — Lumen Patent Firm

(57) ABSTRACT

The extended commutation cell (ECC) is a four-port, four-switch cell that allows for bidirectional energy transport in two orthogonal directions throughout the cell. By cascading multiple cells, a multilevel converter can be constructed with a high number of levels. The voltage across each cell capacitor can be adjusted independently of the load, resulting in high flexibility in output levels. Improved fault tolerance is also provided.

20 Claims, 17 Drawing Sheets

(56) References Cited

U.S. PATENT DOCUMENTS

| | | | |
|---|---|---|---|
| 2013/0235628 A1* | 9/2013 | Dong | H02M 7/797 363/47 |
| 2013/0308353 A1* | 11/2013 | Leu | H02M 7/537 363/40 |
| 2013/0328404 A1* | 12/2013 | Nosaka | G05F 1/67 307/78 |
| 2014/0098573 A1* | 4/2014 | Pan | H02M 3/335 363/16 |
| 2014/0104907 A1* | 4/2014 | Shimada | H02M 7/487 363/80 |
| 2014/0307487 A1* | 10/2014 | Chang | H02M 1/4241 363/34 |
| 2015/0022164 A1* | 1/2015 | Ye | H02M 1/4225 323/210 |
| 2015/0084701 A1* | 3/2015 | Perreault | H03F 3/193 330/297 |
| 2015/0365000 A1* | 12/2015 | Dhuyvetter | H02M 3/1582 323/271 |
| 2016/0072404 A1* | 3/2016 | Beebe | H03B 5/26 363/97 |
| 2016/0352218 A1* | 12/2016 | Stauth | H02M 1/08 |
| 2017/0063233 A1* | 3/2017 | Lehn | H02M 3/158 |

OTHER PUBLICATIONS

Dijkhuizen, "Multilevel converters: review, form, function and motivation", 2012, Ever 2012.

Kasper et al., "Novel high voltage conversion ratio 'rainstick' DC/DC converters", 2013, IEEE.

Pecelj et al., "A soft-switched, flying inductor DC-DC converter suitable for photovoltaic panels", 2012, IEEE 7th Intl. Power Electronics and Motion Control conference.

* cited by examiner

CASCADABLE MODULAR 4-SWITCH EXTENDED COMMUTATION CELL

CROSS REFERENCE TO RELATED APPLICATIONS

This application is a continuation in part of U.S. application Ser. No. 14/749,255, filed on Jun. 24, 2015, and hereby incorporated by reference in its entirety.

Application Ser. No. 14/749,255 claims the benefit of U.S. provisional patent application 62/016,294, filed on Jun. 24, 2014, and hereby incorporated by reference in its entirety.

FIELD OF THE INVENTION

This invention relates to electrical power converters.

BACKGROUND

With the rapid development of electronics one can find electric power converters, such as DC-DC and AC-DC converters, almost everywhere. In the search for an increasing power density, the switching frequency is being raised and multilevel converters are being used, reducing the size of passive filtering components.

The filtering components use a great portion of the volume of a power converter. To further reduce the size much effort is made in the development of (new) multilevel and multicell converter topologies, and modular converter structures. By using a higher number of levels, opposed to only two, the ripple, and consequently the volume of filtering components is reduced. Several popular examples of such multilevel/multicell converters include the flying capacitor converter, neutral-point clamped converter, cascaded cell multilevel converter and modular multilevel converter. However, current multilevel topologies have poor (linear) scaling of the levels with respect to the number of switches. There are multilevel topologies that scale exponentially with the number of switches, but these topologies require isolated voltage sources or they can not supply active power from each level.

Another point of concern is the reliability of power electronics. In most cost-driven applications, a single component failure immediately results in a defective product. To ensure sufficient reliability, power semiconductors are not used up to their full potential. A basic circuit that is applied in most power converter topologies is the commutation cell, which includes two switches, one inductor and one capacitor. The switches can be stressed more when making the circuit single-fault safe. However, this comes at a high cost: i.e. adding another six switches and drivers, and replacing each switch with two parallel branches of two series switches. This high cost for single-fault safe operation, also applies to the known multilevel converters such as the flying capacitor and neutral-point clamped converter, making it generally not interesting to implement except for special applications, such as aerospace ones.

Accordingly, it would be an advance in the art to provide multilevel power converters having improved scaling of output levels with respect to the number of switches and also having improved fault tolerance.

SUMMARY

We provide an innovative commutation cell that allows for more flexibility. Adding multiple cells in series results in a rapid increase in the number of levels, and adding cells in parallel enables single-fault safe operation. This new commutation cell, designated as the extended commutation cell (ECC), leads to power converter topologies such as high-ratio converters and multilevel converters. The switching cell is modular and can be cascaded, doubling the amount of levels with each additional cell. Within the converter, the voltage rating of all switches is only determined by the capacitor voltages of the neighboring cells. The voltage across each cell capacitor is controlled independently of the load and can be adjusted in real-time, directly changing the output levels.

DETAILED DESCRIPTION

I. Extended Commutation Cell

The extended commutation cell (ECC) is a four-port, four-switch switching cell that allows for energy transfer in two orthogonal directions throughout the cell. Due to this property a whole new group of power converters can be constructed, enabling more versatile, more reliable and more efficient power conversion.

A. Basic Cell

Figure 1:
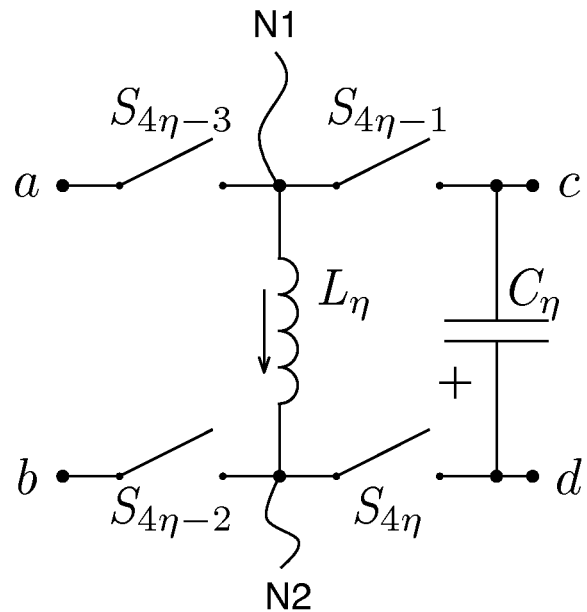
FIG. 1 shows the basic circuit diagram of the extended commutation cell. Connection terminals are indicated with a, b, c and d.

The basic ECC is shown in FIG. 1 where the connection terminals are indicated with letters a, b, c and d. This basic cell is a four-switch voltage-to-voltage converter where terminals a and b are supposed to operate as a pair, and, so are terminals c and d. More specifically, a capacitor is connected between ports c and d. Two internal nodes (N1, N2) are present, with an inductor connected between N1 and N2. A first switch is configured to open or close an electrical connection between a and N1. A second switch is configured to open or close an electrical connection between c and N1. A third switch is configured to open or close an electrical connection between b and N2. A fourth switch is configured to open or close an electrical connection between d and N2.

Figure 2:
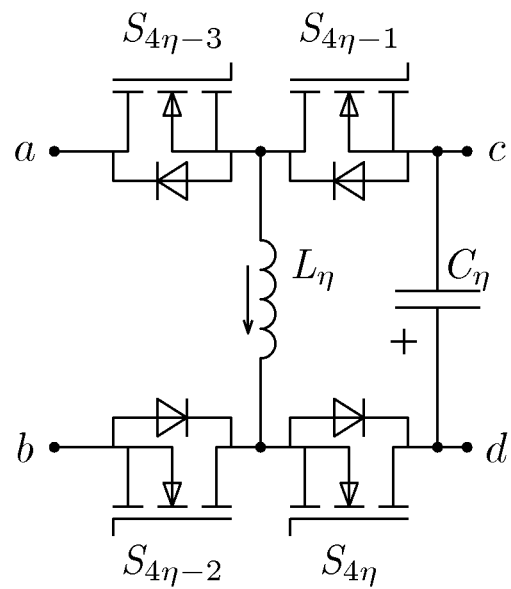
FIG. 2 shows a circuit diagram of a single extended commutation cell constructed with MOSFET switches.

An example of the ECC assembled with metal-oxide-semiconductor field effect transistor switches is given in FIG. 2. Any kind of switch can be employed. Suitable switching devices include, but are not limited to: transistors, metal-oxide-semiconductor field effect transistors, integrated gate-commutated thyristors, and insulated-gate bipolar transistors.

Figure 3A:
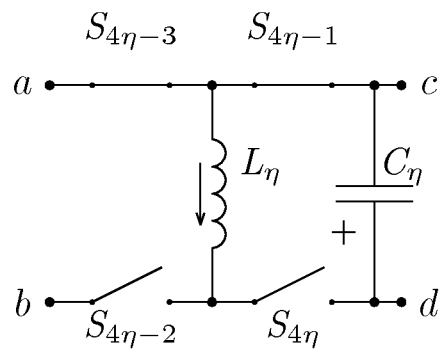
FIGS. 3A-B show ECC direct input-to-output operation. Direct connection between a and c is shown in FIG. 3A, direct connection of b and d is shown in FIG. 3B.
Figure 3B:
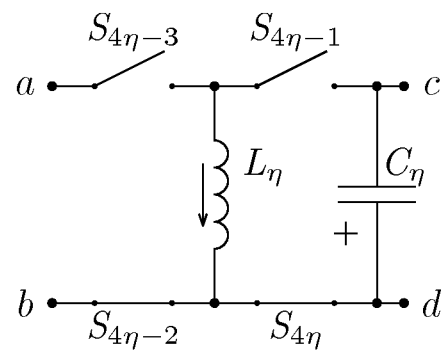

Operation of the ECC has two separate modes. One mode is the input-to-output direct connection, using switches $S_{4n-3}$ and $S_{4n-1}$ turned on simultaneously, as in FIG. 3A, or with switches $S_{4n-2}$ and $S_{4n}$ turned on as in FIG. 3B. With the first pair of switches, terminal a is connected to c, with the second pair, terminal b is connected to d.

Figure 4A:
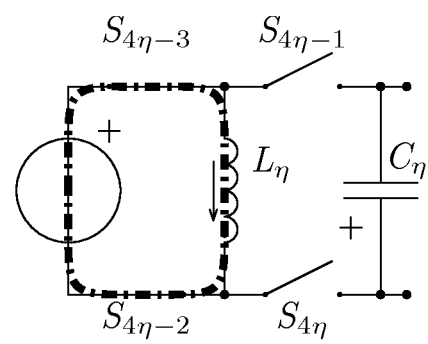
FIGS. 4A-B show ECC buck-boost operation. Inductor charging/discharging to the input voltage source is shown in FIG. 4A, inductor charging/discharging to the cell capacitor is shown in FIG. 4B.
Figure 4B:
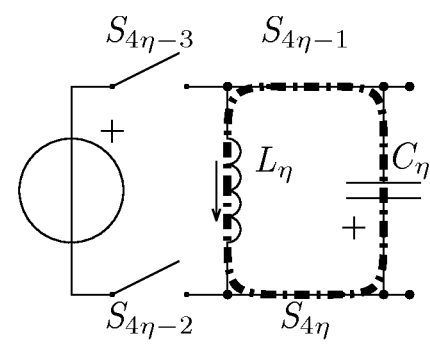
Figure 5A:
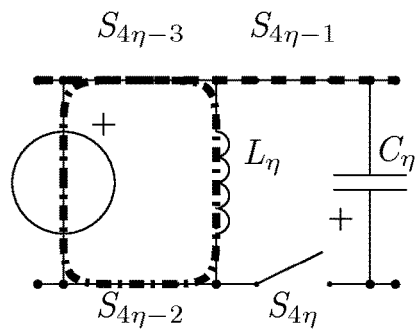
FIGS. 5A-D show combined ECC operation of input-to-output direct connection and buck-boost operation. Input-to-output direct connection path is shown with a dashed lined and the buck-boost path is shows with a dash-dotted line.
Figure 5B:
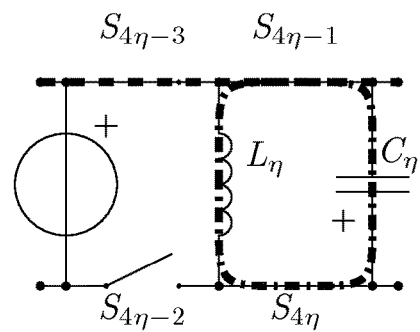
Figure 5C:
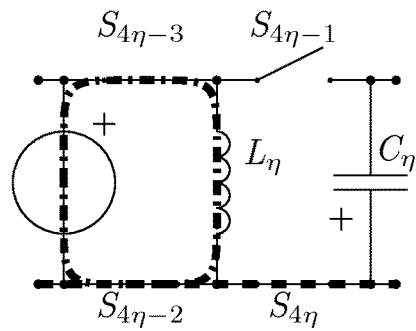
Figure 5D:
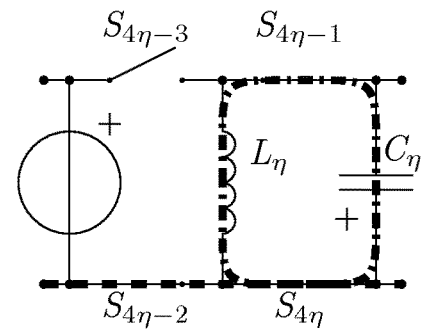
Figure 6A:
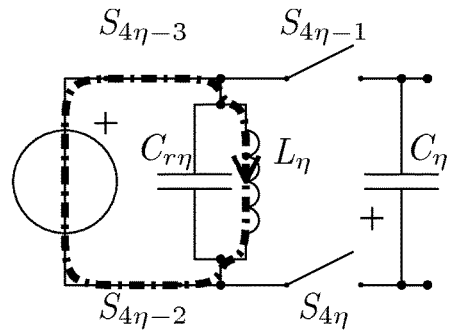
FIGS. 6A-F show ECC zero voltage switching buck-boost operation phases. System transitions are from FIG. 6A→FIG. 6B→ . . . →FIG. 6F→FIG. 6A etc. Current flow direction is indicated by a small arrow in the inductor.
Figure 6B:
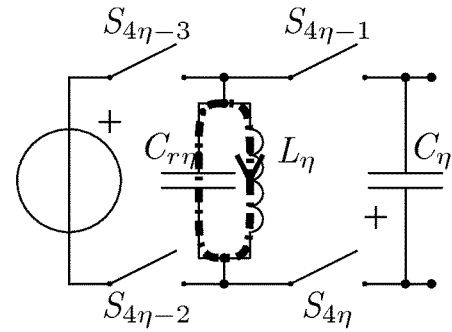
Figure 6C:
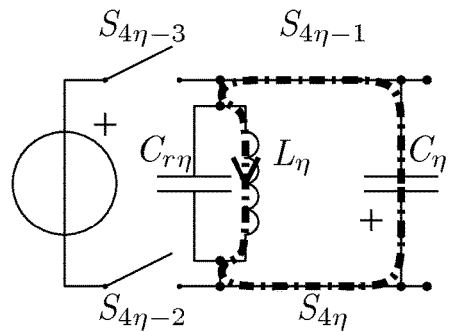
Figure 6D:
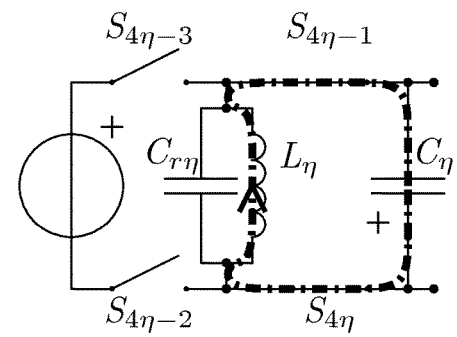
Figure 6E:
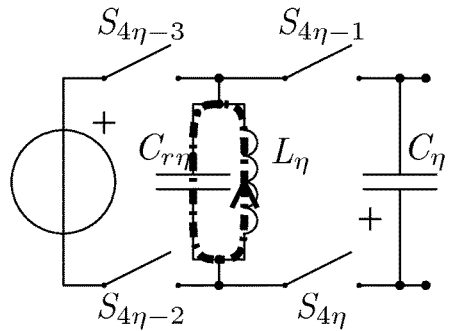
Figure 6F:
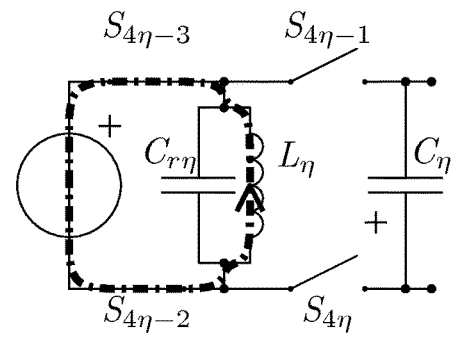

The second mode is the buck-boost operation. With the buck-boost operation, energy can be transferred between a voltage source connected between terminals a and b and the capacitor $C_n$. The two cycles for the indirect energy transfer between the input voltage source and the capacitor are shown in FIGS. 4A-B. In the case of energy flow from the input voltage source to the capacitor, the inductor is charged from the input in FIG. 4A and discharged to the output in FIG. 4B.

Assuming continuous conduction mode for the buck-boost operation, the capacitor voltage is given by $$U_{C_\eta} = U_{ab} \frac{D_\eta^\perp}{1 - D_\eta^\perp} \quad (1)$$

where $D_\eta^\perp$ is the buck-boost duty ratio for switches $S_{4n-3}$ and $S_{4n-2}$, and switches $S_{4n-1}$ and $S_{4n}$ being complementary. The peak voltage across all switches in the switching cell is $U_{C_n} + U_{ab}$.

Operation of the ECC, with both input-to-output direct connection and buck-boost combined, is shown in FIGS. 5A-D. Clearly, with ideal components, the input-to-output direct connection and the buck-boost operation do not influence each other.

B. Resonant Mode Operation

The buck-boost operation of the ECC can also be operated in a resonant mode to enable zero voltage switching. To enable soft-switching a small resonant capacitor $C_{r_n}$ is placed across the inductor $L_n$. The inductor should be chosen such that the current always passes through zero and that there is enough energy to charge the capacitor $C_{r_n}$ up to the adjacent capacitor voltage. The buck-boost operation with soft-switching is shown in FIGS. 6A-F.

Note that the states in FIGS. 6A-F are without any direct input-to-output operation, but the input-to-output and buck-boost operation are fully decoupled in resonant mode buck-boost operation too. The resonant mode operation only results in soft-switching for the buck-boost operation; the input-to-output operation remains under hard-switching.

II. Example Converters

Using the extended commutation cell a number of new converter topologies can be constructed. In the following subsections a few examples are given.

A. Four-Level Converter

Figure 7:
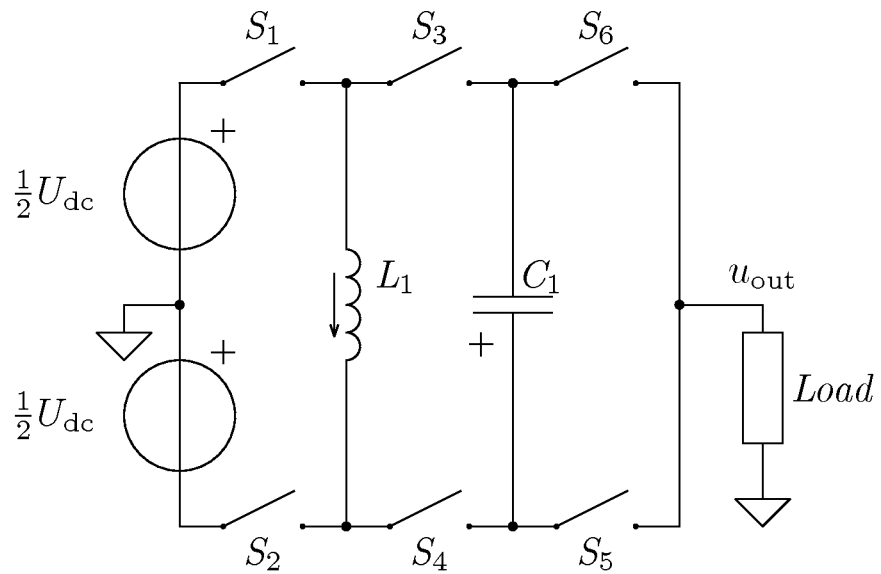
FIG. 7 is a circuit diagram of an ECC based four-level converter, employing a single extended commutation cell.

The most elementary multilevel converter that can be constructed on the basis of the ECC is a four-level converter. This converter uses a single extended commutation cell followed by a half-bridge to shape the two-port structure to a single output. The circuit diagram of the four-level converter is shown in FIG. 7.

The output states of the four-level converter under input-to-output operation mode are shown in FIGS. 8A-D. The corresponding output levels are given in Table I. In FIGS. 8A-D the buck-boost operation is not drawn for the sake of clarity.

TABLE I

Figure 8A:
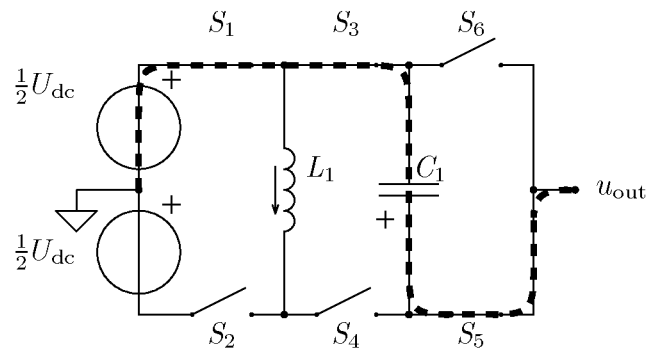
FIGS. 8A-D show output voltage level states of a four-level converter.
Figure 8B:
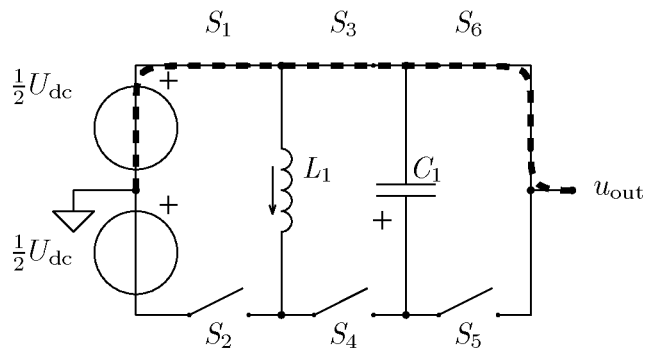
Figure 8C:
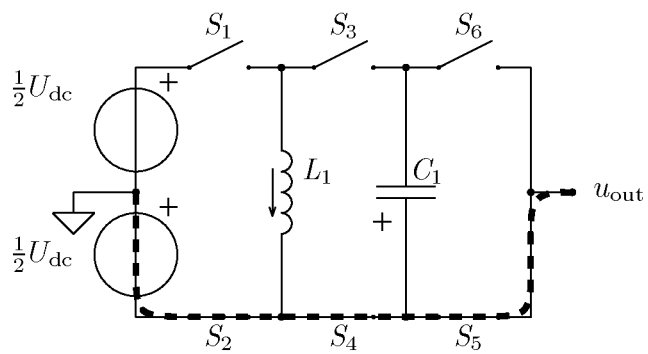
Figure 8D:
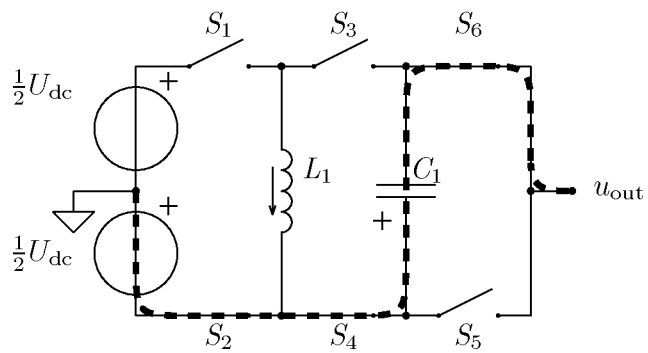

| Four-level converter output voltage per state | |
|---|---|
| State | $u_{out}$ |
| FIG. 8A | $U_{dc}/2 + u_{C1}$ |
| FIG. 8B | $U_{dc}/2$ |
| FIG. 8C | $-U_{dc}/2$ |
| FIG. 8D | $-U_{dc}/2 - u_{C1}$ |

In steady state the voltage across the capacitor $C_1$ is defined by $$U_{C_1} = U_{dc} \frac{D_1^\perp}{1 - D_1^\perp} \quad (2)$$

where $D_1^\perp$ is the buck-boost duty ratio of the ECC.

B. N-Level Converter

Figure 9:
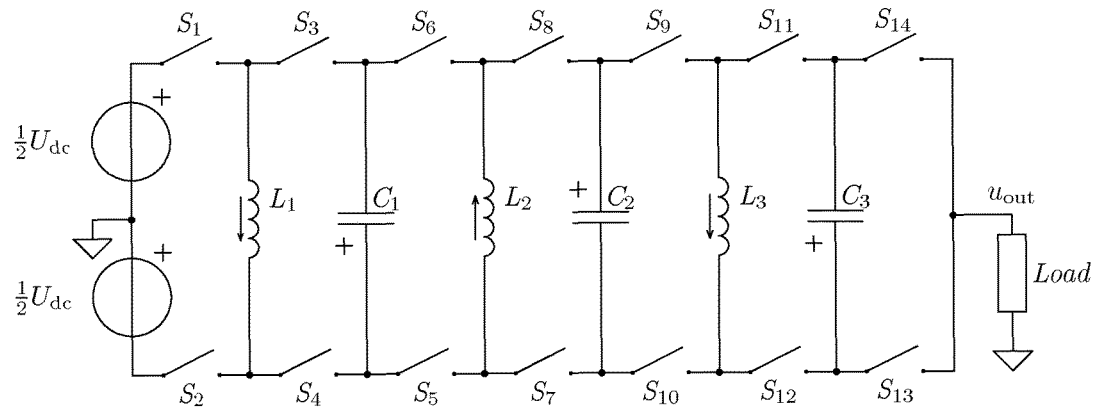
FIG. 9 is a circuit diagram of an ECC based 16-level converter, employing three ECCs.

In the previous section an extended commutation cell is used to make a four-level converter, having a single extended commutation cell followed by a half-bridge. By using the series connection of multiple ECCs a $2^x$-level converter can be constructed, where x is linearly related to the number of switches. As an example, a converter with three ECCs with a total of 16 output levels is shown in FIG. 9. In section III the N-level converter is treated in more detail.

C. Hybrid N-Level Converter

Figure 10:
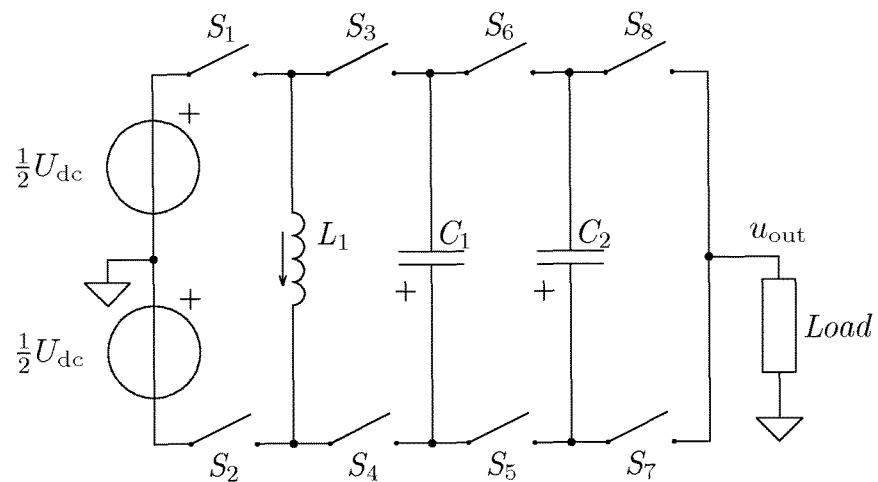
FIG. 10 is a circuit diagram of a hybrid ECC and flying capacitor based six-level converter, employing one ECC followed by a three-level flying capacitor.

In subsection II-B a converter is constructed by putting an arbitrary number of ECCs in series, followed by a half-bridge. This half-bridge can also be replaced by any direct converter, providing different number of output levels. A six-level converter, constructed with a single ECC followed by a flying capacitor three-level converter, is shown in FIG. 10. This example is a true dc-dc converter and is able to supply a dc current at any level.

D. ECC Modular Multilevel Converter

Figure 11:
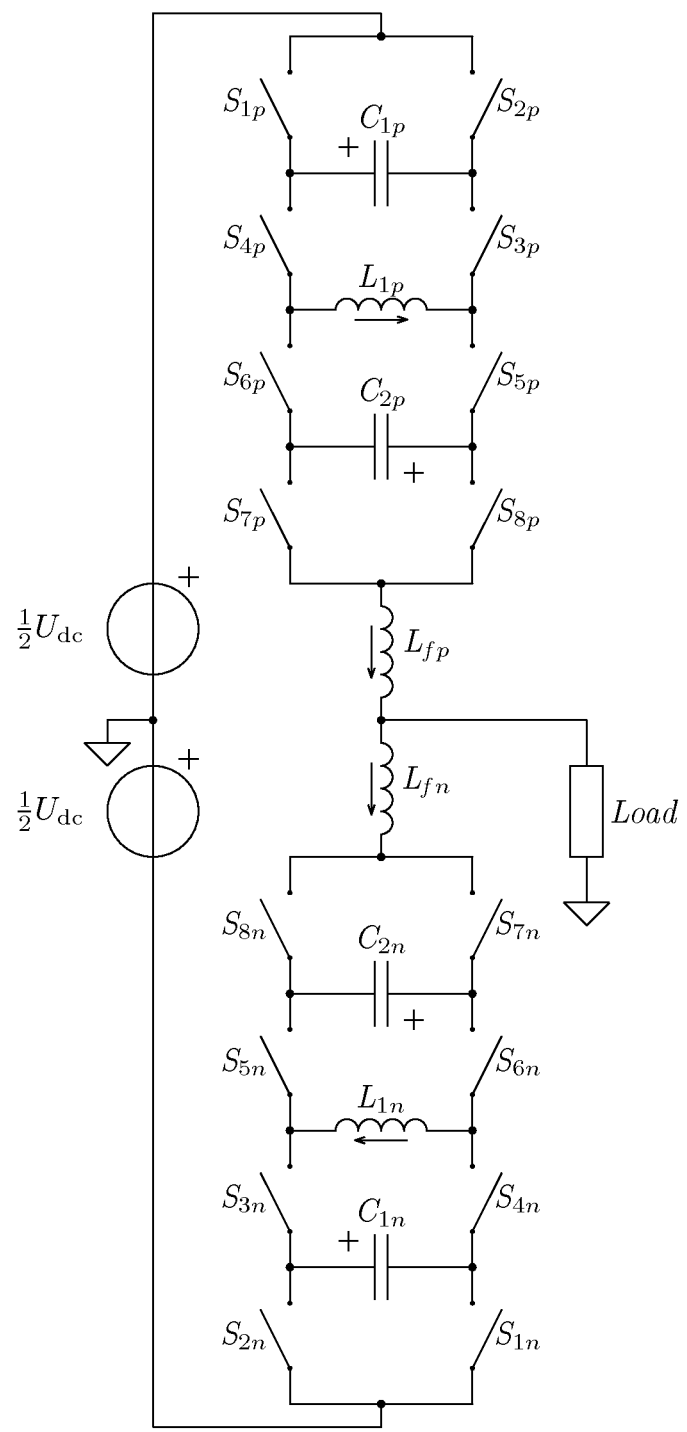
FIG. 11 shows an ECC Modular Multilevel Converter.

A modular multilevel type of converter can also be build using the ECC topology. This way the capacitors in each string can be balanced independent of the output current, reducing the circulating current in the converter. An example converter with two cells is shown in FIG. 11. Using symmetric capacitor voltages the converter has three output levels. With asymmetric capacitor voltages the number of levels increases to four.

A set of capacitor voltages can be determined to obtain a set with the maximum number of output levels for each cell count, this set is given in Table II. The number of cells indicates the number of ECCs per half-leg. In Table II the number of unique levels, indicated with N' is also given for each σ.

TABLE II

Asymmetric ECC-MCC converter capacitor voltage with respect to $U_{dc}$

| σ | N' | $U_{C1}$ | $U_{C2}$ | $U_{C3}$ | $U_{C4}$ | $U_{C5}$ | $\Delta u_{out}$ |
|---|----|------|------|------|------|------|------|
| 1 | 2  | 1    |      |      |      |      | $U_{dc}$ |
| 2 | 4  | 1/3  | 2/3  |      |      |      | $U_{dc}/3$ |
| 3 | 7  | 1/6  | 1/6  | 4/6  |      |      | $U_{dc}/6$ |
| 4 | 14 | 1/13 | 1/13 | 3/13 | 8/13 |      | $U_{dc}/13$ |
| 5 | 27 | 1/26 | 1/26 | 3/26 | 5/26 | 16/26 | $U_{dc}/26$ |

E. Power Factor Correction

Figure 12:
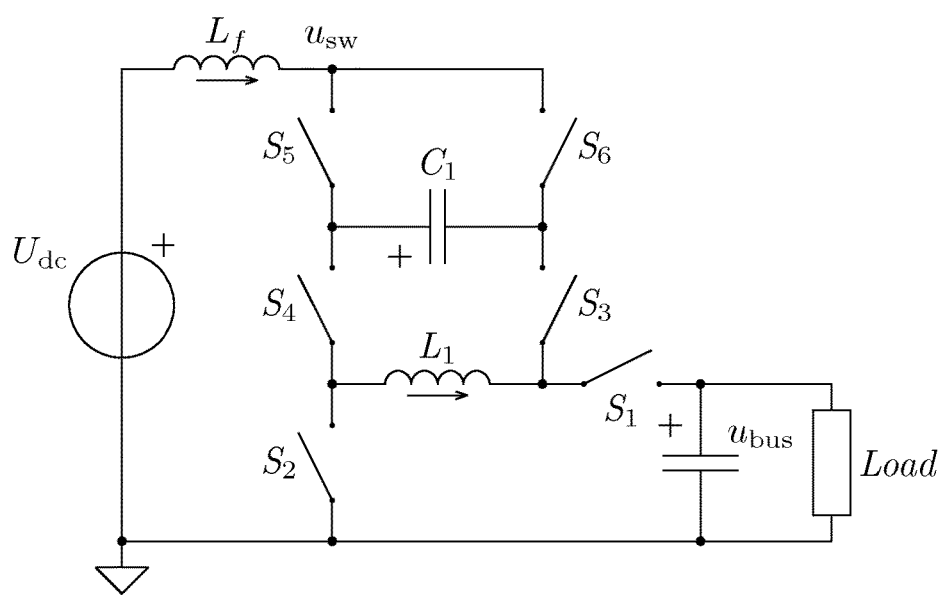
FIG. 12 shows a power factor corrector.

Using the ECC in an alternative way the converter can be applied as a multilevel power factor correction (PFC) circuit for a rectified AC input. An example of such a PFC circuit is shown in FIG. 12 where $U_{dc}$ represents the rectified AC input voltage and $U_{bus}$ is the steady state DC bus voltage.

TABLE III

PFC switch node voltage

| Level | $u_{sw}$ |
|-------|----------|
| 2     | $U_{bus} + u_{C1}$ |
| 1     | $U_{bus}$ |
| 0     | 0 |
| -1    | $-u_{C1}$ |

The switch node voltage $u_{sw}$ has four possible voltage levels. These levels are given in Table III. In case the capacitor voltage is chosen equal to the output voltage ($D_1^{\perp}=0.5$) the valid input range of the converter is $(-U_{bus}, 2U_{bus})$ with bidirectional energy flow. As a result of this a 230 $V_{ac}$ system with PFC leads to a bus voltage of 200 $V_{dc}$ opposed to the regularly used 400 $V_{dc}$. With the lower bus voltage, lower voltage components can be used resulting in lower switching and conduction losses for proceeding switched mode power supplies. The four-level PFC can also be expanded with more ECCs to provide more levels resulting in a smaller input inductor and/or a smaller current distortion on the input.

F. High Ratio Bidirectional Step-Down Converter

With a similar configuration as the PFC a high-ratio step-down or high ratio step-up converter can be assembled. By choosing the capacitor voltages appropriately, the converter can convert a high input voltage to low voltage output, using only low voltage switches.

Figure 13:
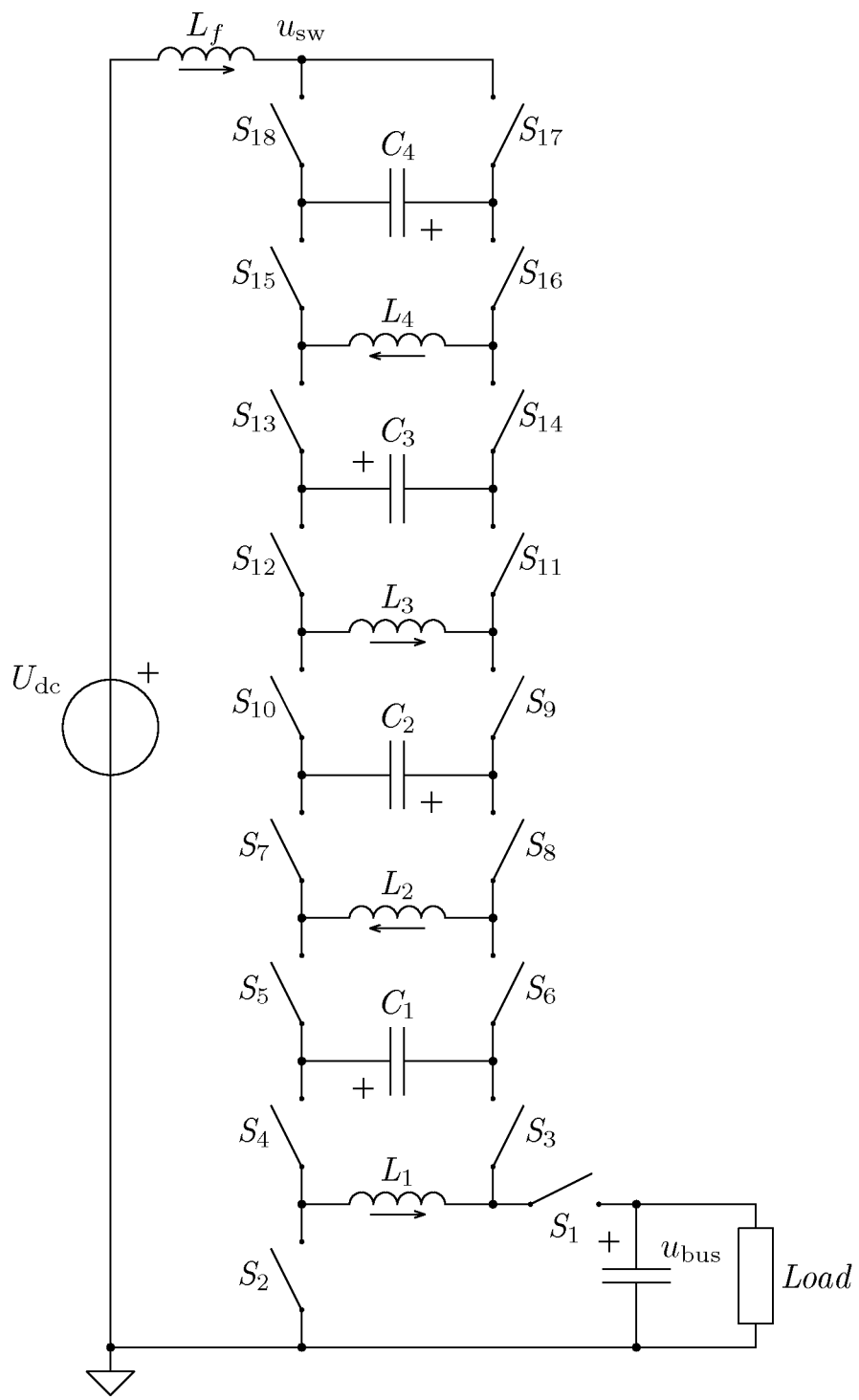
FIG. 13 shows a high ratio step down converter.

The example converter in FIG. 13 shows a four-cell converter. When assigning the capacitor voltage the same for all capacitors, so $U_{C_1}=U_{C_2}=U_{C_3}=U_{C_4}=U_{bus}$ the peak conversion ratio is 1:5, where the switches only require a voltage rating of $2U_{bus}$, and the top switches only need a rating of $U_{bus}$. When extending the converter with more cells the peak conversion ratio increases accordingly. Reversing the power flow direction results in a high-ratio step-up converter, as the converter is naturally bidirectional.

Figure 14:
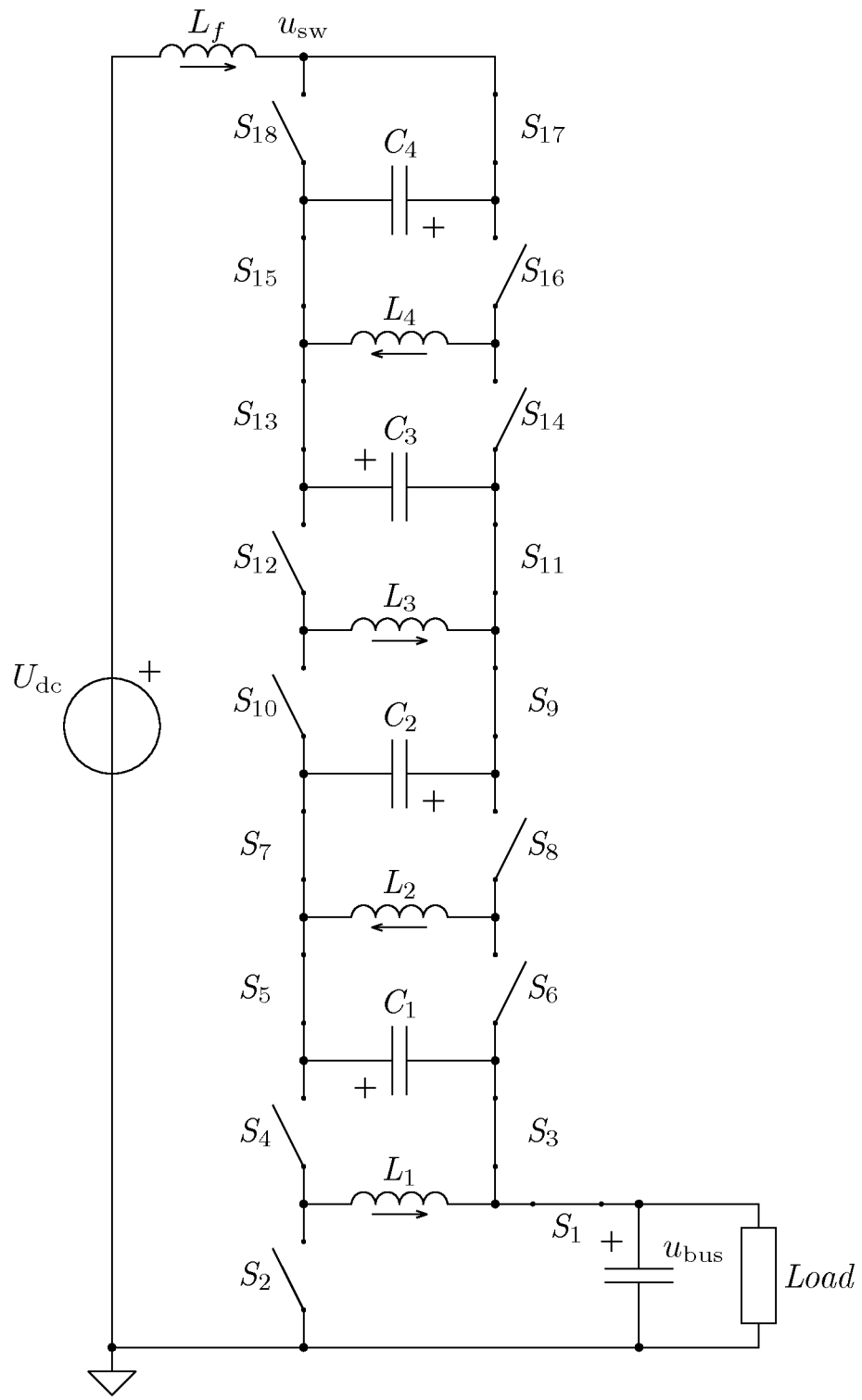
FIG. 14 shows a high ratio step down converter in "rainstick" mode.

In the state where the switch node voltage is at its maximum, as shown in FIG. 14, the converter becomes similar to the known "rainstick" converter topology.

G. N-Level Split-Bus ac-dc Converter

Figure 15:
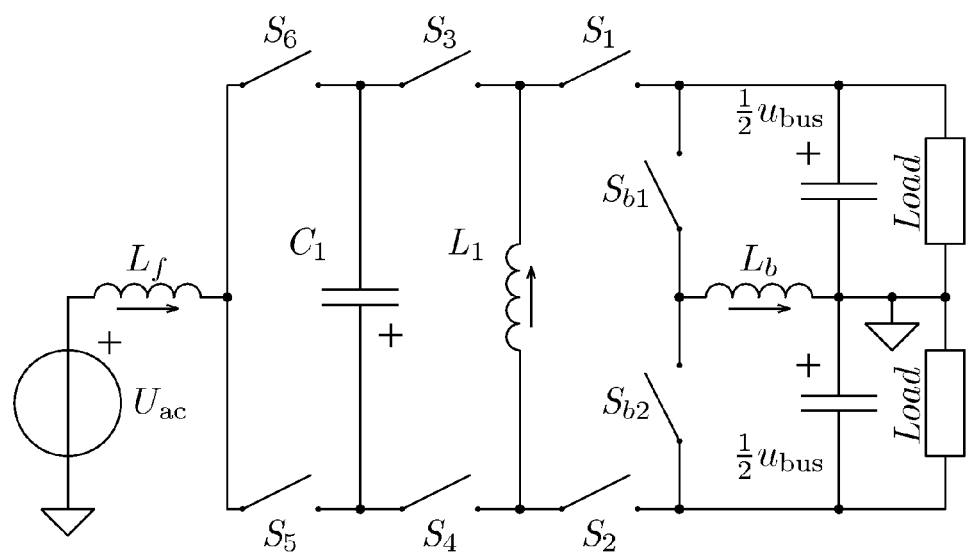
FIG. 15 shows a four-level split-bus ac-dc converter.

Using the N-level converter from section III and exchanging the input and output results in an ac-dc converter with N levels. The energy flow for an asymmetric input is not equally distributed through the output capacitors, therefore an active balancing circuit can be added having inductor $L_b$ and switches $S_{b1}$ and $S_{b2}$ as in the example of FIG. 15.

H. Converter Fabric

Figure 16:
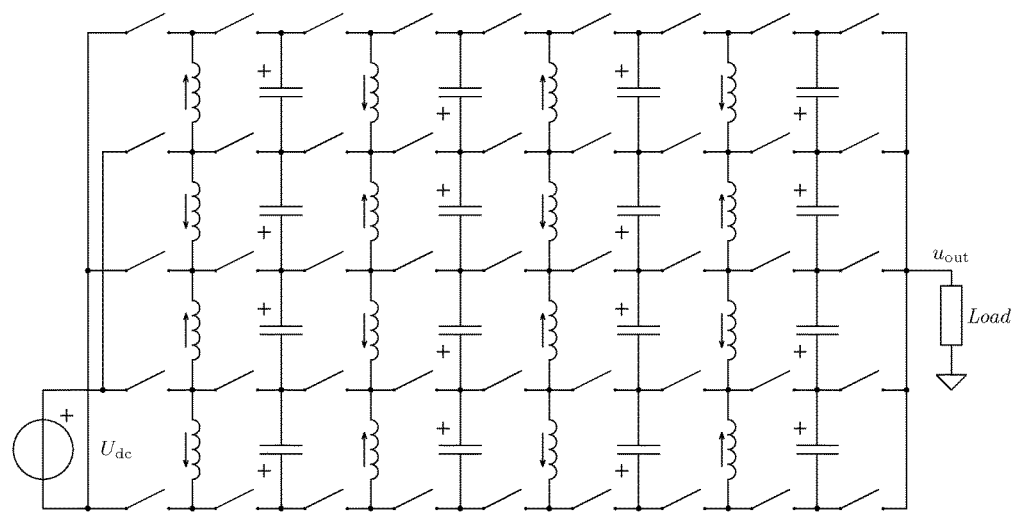
FIG. 16 shows a 4×4 ECC converter fabric.

By aggregating more extended commutation cells in series a multilevel converter with more output levels can be created. The cells can also be placed in parallel in a repeated pattern. The resulting circuit is a parallel redundant converter fabric where the load current is distributed over the different switches and passive components. A 4×4 fabric example is shown in FIG. 16, with the number of parallel cells indicated by the number of parallel buck-boost inductors operating parallel from the input source. Due to the series connection of 4 cells the converter presents a 32-level output.

I. Fault Tolerant Converter

Figure 17:
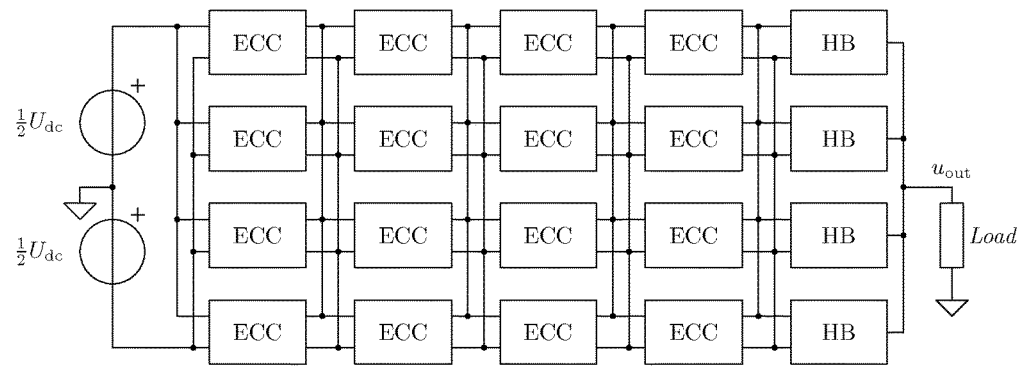
FIG. 17 shows a 4×4 ECC redundant converter structure.

The converter fabric from FIG. 16 provides paralleling of components for load sharing but allows only modest redundancy options. In case a single switch fails an entire row of switches and two rows of passives become inoperable resulting in a very high loss percentage. Therefore also a more flexible structure can be developed that provides much better redundancy performance. This structure is shown in a 4×4 configuration in FIG. 17. The converter as shown has four cells in parallel (ρ=4) and four cells in series (σ=4) resulting in a 32-level converter.

In the example, multiple switches may fail before the converter is unable to keep supplying the load. In three of four adjacent parallel ECCs a random switch may fail. In adjacent series cells a switch may fail in each cell without fully disabling the converter. In the half-bridge (HB) cells, at the end of each row, multiple open-switch failures are allowed but only a single failure to short. A single failure to short in one of the half bridge cells reduces the number of output levels by a factor of two.

Besides the advantages of redundancy, the fault tolerant converter provides also means to reduce stress in the cell capacitors. By performing interleaved buck-boost operation in each of the parallel cells the current ripple in the capacitors may be greatly reduced.

III. N-Level Converter

In the N-level converter each additional cell in the converter multiplies the number of available output voltage levels by two. Therefore the number of levels, as a function of the number of ECC cells, is given by $$N=2^\sigma \cdot 2=2^{\sigma+1} \qquad (3)$$

where σ is the number of cells cascaded in series and N is the number of levels. The initial factor of two is for the number of levels of the half-bridge. For a given number of cells the required number of switches, denoted by $n_S$, is given by $$n_S = 4\sigma + 2 \quad (4)$$

Figure 18:
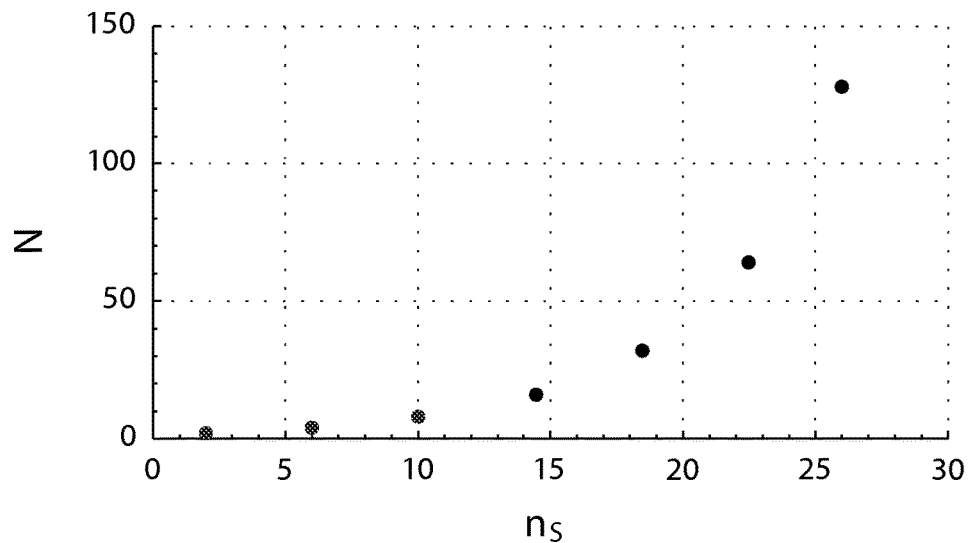
FIG. 18 is a plot of ECC level and switch count.

The resulting number of levels for a given number of switches is plotted in FIG. 18. From substituting Eq. (4) into Eq. 3, it follows that the number of switches $n_S$ required for a number of levels N is $$n_s = 2\frac{2\ln(N) - \ln(2)}{\ln(2)} \quad (5)$$

For comparison, $n_S$ for a flying capacitor converter is given by $$n_S = 2(N-1) \quad (6)$$

which is also valid for the neutral-point clamped and cascaded cell multilevel converter.

Figure 19:
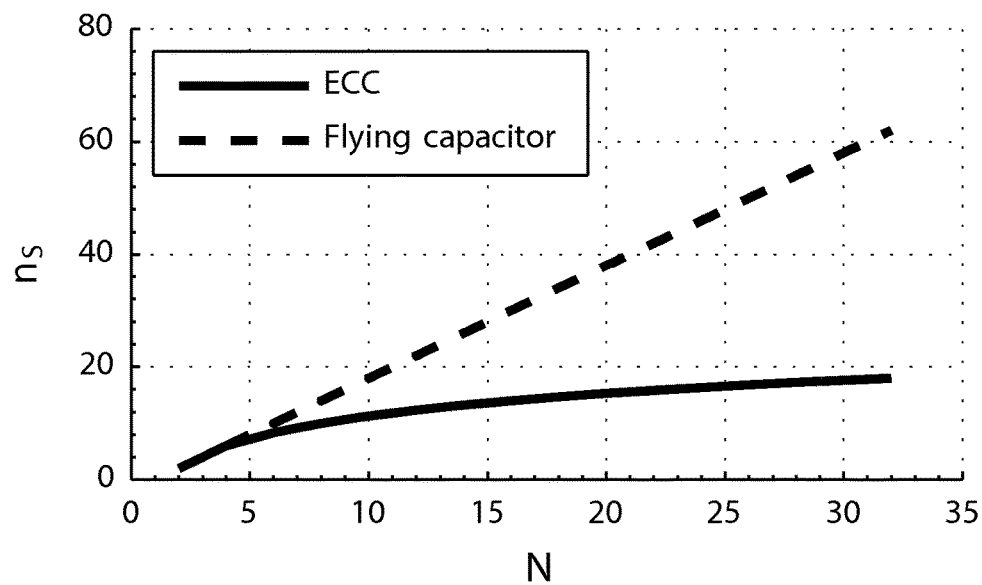
FIG. 19 is a plot showing the required number of switches $n_S$ versus number of levels N for an ECC based converter and for a flying capacitor converter.

The resulting number of switches for both the ECC and flying capacitor converter, for an arbitrary number of levels, is shown in FIG. 19. Note that for ease of visualization a continuous line is plotted in spite of the fact that Eqs. (5) and (6) only hold for specific values of N.

At two or four levels the number of switches for the flying capacitor and ECC multilevel converter are equal, for higher numbers of levels the number of switches in the flying capacitor converter dramatically increases.

It should be emphasized that each of the ECC cells in an N-level converter has decoupled buck-boost and direct input-to-output operation modes. Therefore the buck-boost operation is independent for each ECC cell. If required, each of the cells may be operated at a different switching frequency or phase.

TABLE IV 16-level converter output voltage

| l | $u_{out}$ |
|---|---|
| 8 | $U_{dc}/2 + u_{C1} + u_{C2} + u_{C3}$ |
| 7 | $U_{dc}/2 + u_{C1} + u_{C2}$ |
| 6 | $U_{dc}/2 + u_{C1}$ |
| 5 | $U_{dc}/2 + u_{C1} - u_{C3}$ |
| 4 | $U_{dc}/2 + u_{C3}$ |
| 3 | $U_{dc}/2$ |
| 2 | $U_{dc}/2 - u_{C2}$ |
| 1 | $U_{dc}/2 - u_{C2} - u_{C3}$ |
| -1 | $-U_{dc}/2 + u_{C2} + u_{C3}$ |
| -2 | $-U_{dc}/2 + u_{C2}$ |
| -3 | $-U_{dc}/2$ |
| -4 | $-U_{dc}/2 - u_{C3}$ |
| -5 | $-U_{dc}/2 - u_{C1} + u_{C3}$ |
| -6 | $-U_{dc}/2 - u_{C1}$ |
| -7 | $-U_{dc}/2 - u_{C1} - u_{C2}$ |
| -8 | $-U_{dc}/2 - u_{C1} - u_{C2} - u_{C3}$ |

A. Output Levels

The output levels that can be achieved with the 16-level converter from FIG. 9 are listed in Table IV. Depending on the capacitor voltages $U_{C_1}$, $U_{C_2}$ and $U_{C_3}$ a set of output voltage levels is defined, indexed with $$l \in \{N/2, \ldots, 1, -1, \ldots, -N/2\} \quad (7)$$

In case a 0 level is required ($u_{out}=0V$), two switch states will result in a 0V output and a maximum of 15 unique output levels will remain. The set of levels for an eight-level converter can be deducted from Table IV by removing $u_{C_3}$ and filtering away the resulting double outcomes. For converters with a higher number of levels the pattern from Table IV repeats.

TABLE V

N-level converter capacitor voltage with respect to $U_{dc}$ to obtain equidistant output levels

| σ | $U_{C1}$ | $U_{C2}$ | $U_{C3}$ | $U_{C4}$ | $U_{C5}$ | $\hat{u}_{out}$ | $\Delta u_{out}$ |
|---|---|---|---|---|---|---|---|
| 1 | 1 | | | | | $\pm 3/2 U_{dc}$ | $U_{dc}$ |
| 2 | 1/3 | 1/3 | | | | $\pm 7/6 U_{dc}$ | $U_{dc}/3$ |
| 3 | 3/5 | 1/5 | 1/5 | | | $\pm 3/2 U_{dc}$ | $U_{dc}/5$ |
| 4 | 5/11 | 3/11 | 1/11 | 1/11 | | $\pm 31/22 U_{dc}$ | $U_{dc}/11$ |
| 5 | 11/21 | 5/21 | 3/21 | 1/21 | 1/21 | $\pm 3/2 U_{dc}$ | $U_{dc}/21$ |

An example of a capacitor voltage choice for the 1, 2, 3, 4 and 5-cell converter is shown in Table V together with the resulting output range and step size between adjacent levels, all these values being shown with respect to $U_{dc}$. For each case in the table there is no 0-level. Note that in Table V the Jacobsthal integer sequence can be observed in the numerator of the capacitor voltage fractions.

Using this fact a general expression can be derived for the capacitor voltage and $\Delta u_{out}$ (the output voltage step). The capacitor voltage for $C_\eta$ is given by $$\frac{U_{C_\eta}(\sigma)}{U_{dc}} = \frac{(-1)^{\sigma-\eta} + 2^{\sigma+1-\eta}}{(-1)^\sigma + 2^{\sigma+1}} \quad (8)$$

The resulting level step size is calculated with $$\frac{\Delta u_{out}(\sigma)}{U_{dc}} = \frac{3}{(-1)^\sigma + 2^{\sigma+1}} \quad (9)$$

The corresponding peak output voltage is given by $$\frac{\hat{u}_{out}(\sigma)}{U_{dc}} = \frac{3}{2} \cdot \frac{2^{\sigma+1} - 1}{2^{\sigma+1} + (-1)^\sigma} \quad (10)$$

which converges to 3/2 as σ→∞.

B. Gating Signals

In this section the relation between the direct input-to-output operation gating signals and the output levels is elaborated. A direct input-to-output gating signal $\vec{g}_\eta$ is defined as $$\vec{g}_\eta = \begin{cases} 0 & \text{then } S_{4\eta-2} \text{ and } S_{4\eta} \text{ on} \\ 1 & \text{then } S_{4\eta-3} \text{ and } S_{4\eta-1} \text{ on} \end{cases} \quad (11)$$

for η=1 . . . σ, and the output gating signal of the half-bridge is defined as $$\vec{g}_{\sigma+1} = \begin{cases} 0 & \text{then } S_{4\sigma+2} \text{ on} \\ 1 & \text{then } S_{4\sigma+1} \text{ on} \end{cases} \quad (12)$$

In Table VI the gating signals are given for each of the levels of a 16-level converter. The rightmost four columns indicate the contributions of $U_{dc}/2$ and $u_{C_\eta}$ to the output voltage.

TABLE VI

16-level converter gating signals

| l | $g_1^{\hookrightarrow}$ | $g_2^{\hookrightarrow}$ | $g_3^{\hookrightarrow}$ | $g_4^{\hookrightarrow}$ | $U_{dc}/2$ | $u_{C1}$ | $u_{C2}$ | $u_{C3}$ |
|---|---|---|---|---|---|---|---|---|
| 8  | 1 | 1 | 1 | 1 | 1  | 1  | 1  | 1  |
| 7  | 1 | 1 | 1 | 0 | 1  | 1  | 1  | 0  |
| 6  | 1 | 1 | 0 | 1 | 1  | 1  | 0  | 0  |
| 5  | 1 | 1 | 0 | 0 | 1  | 1  | 0  | −1 |
| 4  | 1 | 0 | 1 | 1 | 1  | 0  | 0  | 1  |
| 3  | 1 | 0 | 1 | 0 | 1  | 0  | 0  | 0  |
| 2  | 1 | 0 | 0 | 1 | 1  | 0  | −1 | 0  |
| 1  | 1 | 0 | 0 | 0 | 1  | 0  | −1 | −1 |
| −1 | 0 | 1 | 1 | 1 | −1 | 0  | 1  | 1  |
| −2 | 0 | 1 | 1 | 0 | −1 | 0  | 1  | 0  |
| −3 | 0 | 1 | 0 | 1 | −1 | 0  | 0  | 0  |
| −4 | 0 | 1 | 0 | 0 | −1 | 0  | 0  | −1 |
| −5 | 0 | 0 | 1 | 1 | −1 | −1 | 0  | 1  |
| −6 | 0 | 0 | 1 | 0 | −1 | −1 | 0  | 0  |
| −7 | 0 | 0 | 0 | 1 | −1 | −1 | −1 | 0  |
| −8 | 0 | 0 | 0 | 0 | −1 | −1 | −1 | −1 |

A clear binary pattern can be observed in the columns defining $g_\eta^{\hookrightarrow}$ and $g_{\sigma+1}^{\hookrightarrow}$. Similarly a gating signal can be defined for the buck-boost operation mode of the converter. This gating signal $g_\eta^\perp$ is defined as $$g_\eta^\perp = \begin{cases} 0 & \text{then } S_{4\eta-1} \text{ and } S_{4\eta} \text{ on} \\ 1 & \text{then } S_{4\eta-3} \text{ and } S_{4\eta-2} \text{ on} \end{cases} \quad (13)$$

The gating of the switches in each cell is eventually controlled by both $g_\eta^\perp$ and $g_\eta^{\hookrightarrow}$. The gating vector per cell $g_\eta$ is defined as $$g_\eta = \begin{bmatrix} g_{4\eta-3} \\ g_{4\eta-2} \\ g_{4\eta-1} \\ g_{4\eta} \end{bmatrix} = \begin{bmatrix} g_\eta^\perp = 1 \vee g_\eta^{\hookrightarrow} = 1 \\ g_\eta^\perp = 1 \vee g_\eta^{\hookrightarrow} = 0 \\ g_\eta^\perp = 0 \vee g_\eta^{\hookrightarrow} = 1 \\ g_\eta^\perp = 0 \vee g_\eta^{\hookrightarrow} = 0 \end{bmatrix} \quad (14)$$

where the corresponding switch is "on" if the indicated condition is true. For the half-bridge switches the state is solely defined by $g_{\sigma+1}^{\hookrightarrow}$.

IV. Reduced Load Step Multilevel Converter

In section III a converter is described with N levels. In each of the cells the cell output current is either $i_{out}$, 0 or $-i_{out}$. When switching between some of the adjacent output levels, the current in an ECC switches between $i_{out}$ and $-i_{out}$ or vice versa, resulting in an effective load step of $2i_{out}$. In Table IV, for the 16 levels converter, these steps occur between levels 5↔4, 1↔−1 and −4↔−5.

Leaving out some levels, such that a step between $i_{out}$ and $-i_{out}$ cannot occur in adjacent levels, result in a subset of levels from the N-level converter. The number of remaining unique levels N' for σ=1 . . . 5 is shown in Table VII, including the corresponding capacitor voltages to obtain equidistant output levels. In case N' is odd, the converter has at least one zero-level.

TABLE VII

N-level reduced step converter capacitor voltage with respect to $U_{dc}$

| σ | N' | $U_{C1}$ | $U_{C2}$ | $U_{C3}$ | $U_{C4}$ | $U_{C5}$ | $\hat{u}_{out}$ |
|---|----|------|------|------|------|------|------|
| 1 | 4  | 1    |      |      |      |      | ±3/2$U_{dc}$ |
| 2 | 7  | 1/2  | 1/2  |      |      |      | ±3/2$U_{dc}$ |
| 3 | 12 | 2/3  | 1/3  | 1/3  |      |      | ±11/6$U_{dc}$ |
| 4 | 20 | 3/5  | 2/5  | 1/5  | 1/5  |      | ±19/10$U_{dc}$ |
| 5 | 33 | 5/8  | 3/8  | 2/8  | 1/8  | 1/8  | ±2$U_{dc}$ |

In this special case of the N-level converter the Fibonacci sequence can be observed in the numerators of the capacitor voltages. The number of unique levels that remain is the sum of the Fibonacci sequence. A general expression is derived for the capacitor voltage and $\Delta u_{out}$. The capacitor voltage for $U_{C_n}$ is given by $$\frac{U_{C_\eta}(\sigma)}{U_{dc}} = \frac{F_{\sigma+1-\eta}}{F_{\sigma+1}} \quad (15)$$

where $F_n$ is the $n^{th}$ Fibonacci number. The resulting level step size is calculated with $$\frac{\Delta u_{out}(\sigma)}{U_{dc}} = \frac{1}{F_{\sigma+1}} \quad (16)$$

The corresponding peak output voltage is the sum of all capacitor voltages and half the bus voltage $$\frac{\hat{u}_{out}(\sigma)}{U_{dc}} = \frac{1}{2} + \sum_{n=1}^{\sigma} \frac{F_n}{F_{\sigma+1}} = \frac{1}{2} + \frac{F_{\sigma+2}-1}{F_{\sigma+1}} \quad (17)$$

where we make use of the Fibonacci sequence property that the sum over the Fibonacci sequence can be expressed as a single Fibonacci number minus 1. In the limit, for σ going infinite the peak output voltage converges to $(\phi+\frac{1}{2})U_{dc}$, where φ refers to the golden ratio.

The number of unique levels N' is the sum over the Fibonacci sequence, which again can be expressed with a single Fibonacci number, and is given by $$N' = \sum_{n=1}^{\sigma+2} F_n = F_{\sigma+4} - 1 \quad (18)$$

The equations above can be made non-recursive when using Binet's formula to determine the $n^{th}$ Fibonacci number $$F_n = \frac{\left(1+\sqrt{5}\right)^n - \left(1\sqrt{5}\right)^n}{2^n\sqrt{5}} \quad (19)$$

At least two different sets of level vectors can be found for σ=3, a positive and negative aligned set. The positive aligned set is listed in Table VIII and the negative aligned set is listed in Table IX.

TABLE VIII

Three-cell reduced step output consecutive output levels, positive aligned

| l' | l | $u_{out}$ |
|---|---|---|
| 6 | 8 | $U_{dc}/2 + u_{C1} + u_{C2} + u_{C3}$ |
| 5 | 7 | $U_{dc}/2 + u_{C1} + u_{C2}$ |
| 4 | 6 | $U_{dc}/2 + u_{C1}$ |
| 3 | 5 | $U_{dc}/2 + u_{C1} - u_{C3}$ |
| 2 | 3 | $U_{dc}/2$ |
| 1 | 2 | $U_{dc}/2 - u_{C2}$ |
| -1 | 1 | $U_{dc}/2 - u_{C2} - u_{C3}$ |
| -2 | -3 | $-U_{dc}/2$ |
| -3 | -4 | $-U_{dc}/2 - u_{C3}$ |
| -4 | -6 | $-U_{dc}/2 - u_{C1}$ |
| -5 | -7 | $-U_{dc}/2 - u_{C1} - u_{C2}$ |
| -6 | -8 | $-U_{dc}/2 - u_{C1} - u_{C2} - u_{C3}$ |

TABLE IX

Three-cell reduced step output consecutive output levels, negative aligned

| l' | l | $u_{out}$ |
|---|---|---|
| 6 | 8 | $U_{dc}/2 + u_{C1} + u_{C2} + u_{C3}$ |
| 5 | 7 | $U_{dc}/2 + u_{C1} + u_{C2}$ |
| 4 | 6 | $U_{dc}/2 + u_{C1}$ |
| 3 | 4 | $U_{dc}/2 + u_{C3}$ |
| 2 | 3 | $U_{dc}/2$ |
| 1 | -1 | $-U_{dc}/2 + u_{C2} + u_{C3}$ |
| -1 | -2 | $-U_{dc}/2 + u_{C2}$ |
| -2 | -3 | $-U_{dc}/2$ |
| -3 | -5 | $-U_{dc}/2 - u_{C1} + u_{C3}$ |
| -4 | -6 | $-U_{dc}/2 - u_{C1}$ |
| -5 | -7 | $-U_{dc}/2 - u_{C1} - u_{C2}$ |
| -6 | -8 | $-U_{dc}/2 - u_{C1} - u_{C2} - u_{C3}$ |

V. Fault Tolerant Operation

Figure 20:
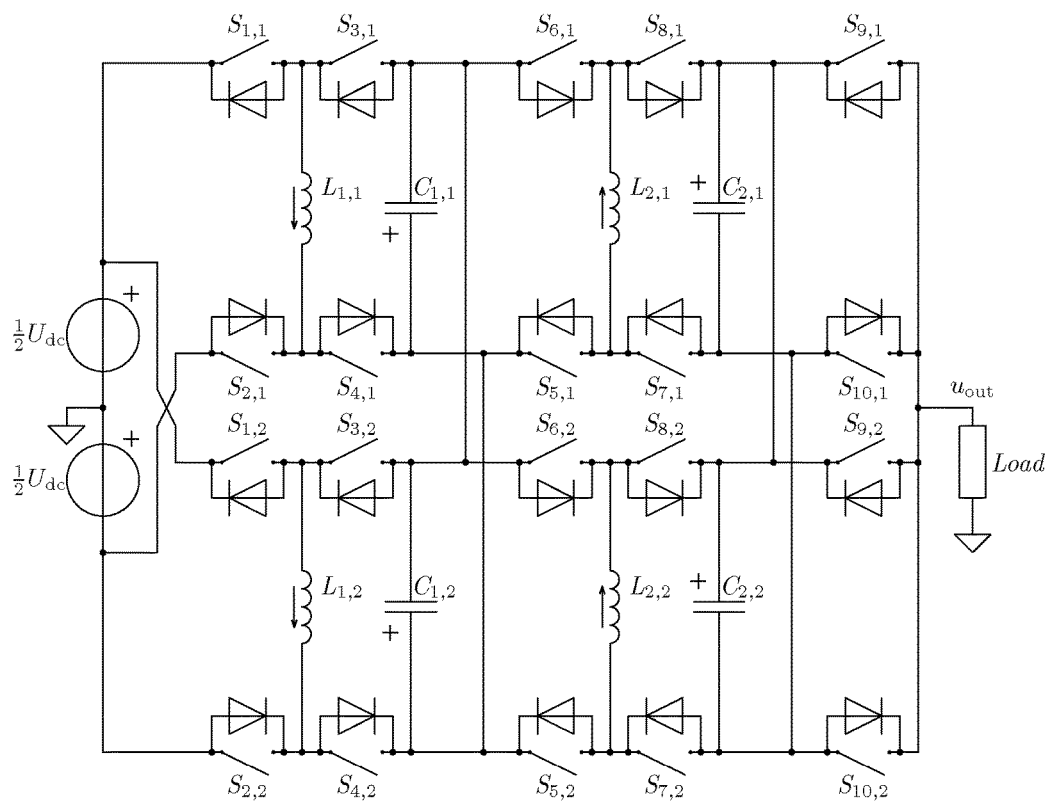
FIG. 20 shows a fault tolerant eight-level converter, employing two series ($\sigma=2$) and two parallel ($\rho=2$) ECCs.

The example converter that is analyzed here is a two-cell eight-level with two branches in parallel as shown in FIG. 20. In the figure the position and orientation of the switch anti-parallel diodes is shown. This amounts to connecting a diode in parallel to each of the switches of the ECC circuits.

A. Fault Situations ECC

In the ECC based eight-level inverter, as shown in FIG. 20, six different switch single-fault conditions can occur. Four possible faults can occur in any of the ECCs and two possible faults can occur in a half-bridge. A switch single-fault is considered to be an open and short at the same time (e.g. no difference is made between fault-to-open and fault-to-short). This is done as a failure to open cannot be trusted for blocking the rated voltage of the switch, similarly, a fault-to-short cannot be used for conducting the rated current of the switch. Therefore, in either case the fault should be safely isolated by a series switch.

Unfortunately a single failed switch cannot be entirely bypassed with the other switches due to the required parallel diodes. These diodes are always present in MOSFETs (metal-oxide-semiconductor field effect transistors) and generally also in IGBTs (insulated-gate bipolar transistors), but the diodes are also required to provide a freewheeling path for the (positive and negative) inductor current. For the mitigation of this issue, there are three main solutions. The first option is to put a bidirectional switch in series with the inductor. In case of a switch failure in the cell, the inductor series switch must be opened to prevent any disturbance of the parallel cells. With the switch opened, the cell is entirely disabled and the power flow can be redirected to the available operational parallel cells. This solution is shown in FIG. 21.

Figure 21:
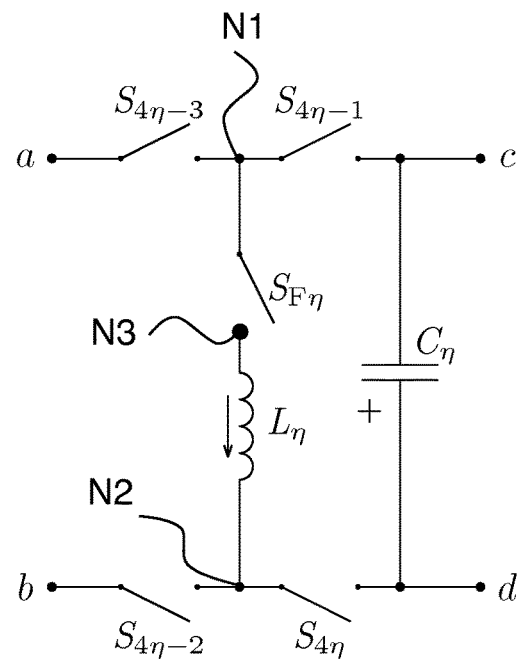
FIG. 21 shows an ECC with an additional bidirectional switch $S_{F_n}$ for fault isolation.

More specifically, in the embodiment of FIG. 21 a capacitor is connected between ports c and d. Three internal nodes (N1, N2, N3) are present, with an inductor connected between N2 and N3. A first switch is configured to open or close an electrical connection between a and N1. A second switch is configured to open or close an electrical connection between c and N1. A third switch is configured to open or close an electrical connection between b and N2. A fourth switch is configured to open or close an electrical connection between d and N2. A fifth switch is configured to open an electrical connection between N1 and N3 when a fault is detected. Any of the preceding variations, embodiments and examples can also be implemented with the ECC subcircuit of FIG. 21. Since the purpose of the fifth switch is to disable the ECC, fast operation is not needed. Thus further options for implementing this switch include, in addition to the above-identified switch options: relays and fuses.

The second option for continued operation with a single fault is to prevent the direct input-to-output operation that causes a short in the failed cell. This result in avoiding the use of half the available output levels. To achieve sufficient output quality the capacitor voltage set-points can be changed. The set of output levels for an eight-level converter is given in Table X, in case of a failure in the first cell, the levels $\{1, \ldots, 4\}$ or $\{-4, \ldots, -1\}$ cannot be used anymore. In case of a failure in the second cell, the levels $\{-3, -1, 2, 4\}$ or $\{-4, -2, 1, 3\}$ should be avoided.

TABLE X

Eight-level converter output voltage per state

| l | $u_{out}$ |
|---|---|
| 4 | $U_{dc}/2 + u_{C1} + u_{C2}$ |
| 3 | $U_{dc}/2 + u_{C1}$ |
| 2 | $U_{dc}/2$ |
| 1 | $U_{dc}/2 - u_{C2}$ |
| -1 | $-U_{dc}/2 + u_{C2}$ |
| -2 | $-U_{dc}/2$ |
| -3 | $-U_{dc}/2 - u_{C1}$ |
| -4 | $-U_{dc}/2 - u_{C1} - u_{C2}$ |

The third possible option is to account for the cross-coupling between the input-to-output operation of the parallel cell(s) and the buck-boost operation of the damaged cell. Note that in this case the buck-boost operation is unidirectional, any unwanted current transferred through the damaged cell should be compensated by adjusting the current reference of the parallel operational cells.

VI. Sine Wave Synthesis

The ECC can be used for constructing a sine wave with a high number of levels. To improve the quality of the sine wave even further the capacitor voltages can be adjusted real-time such that a perfect sine wave can be constructed. In that case an output filter can be completely omitted even with a relatively low number of levels. The downside is that the transient response is worse as the time constant of the buck-boost comes into play.

A. Basic Sine Wave Synthesis

Figure 22:
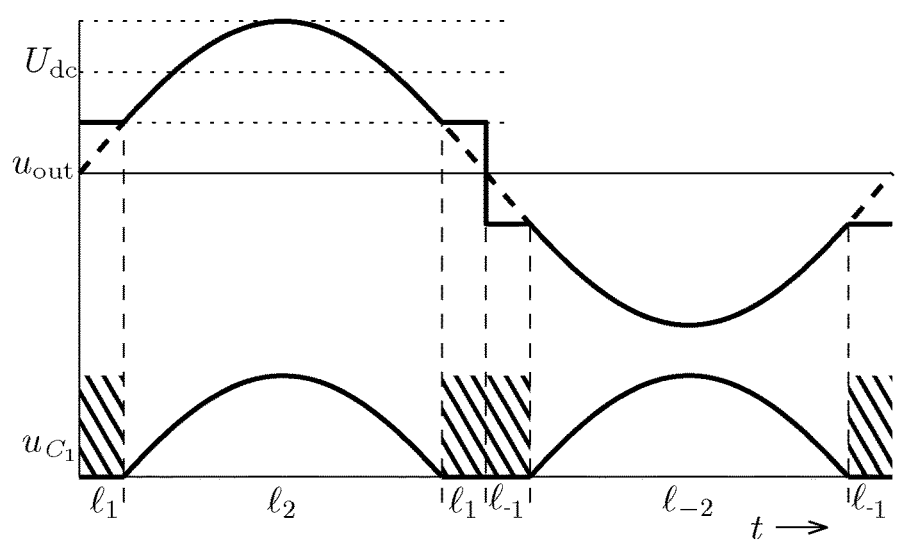
FIG. 22 shows a single-cell converter used to synthesize a sine wave.
Figure 23:
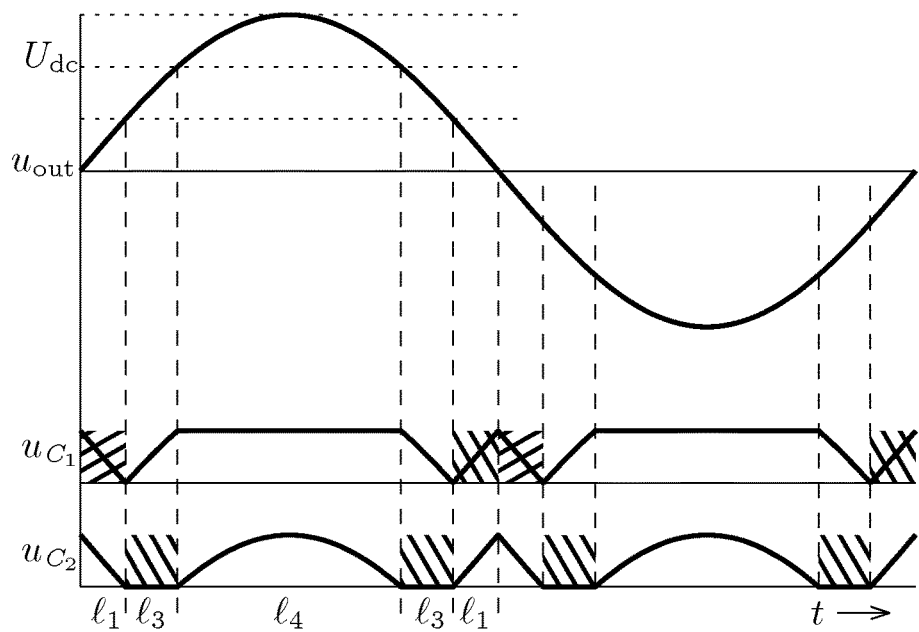
FIG. 23 shows a two-cell converter used to synthesize a sine wave.
Figure 24:
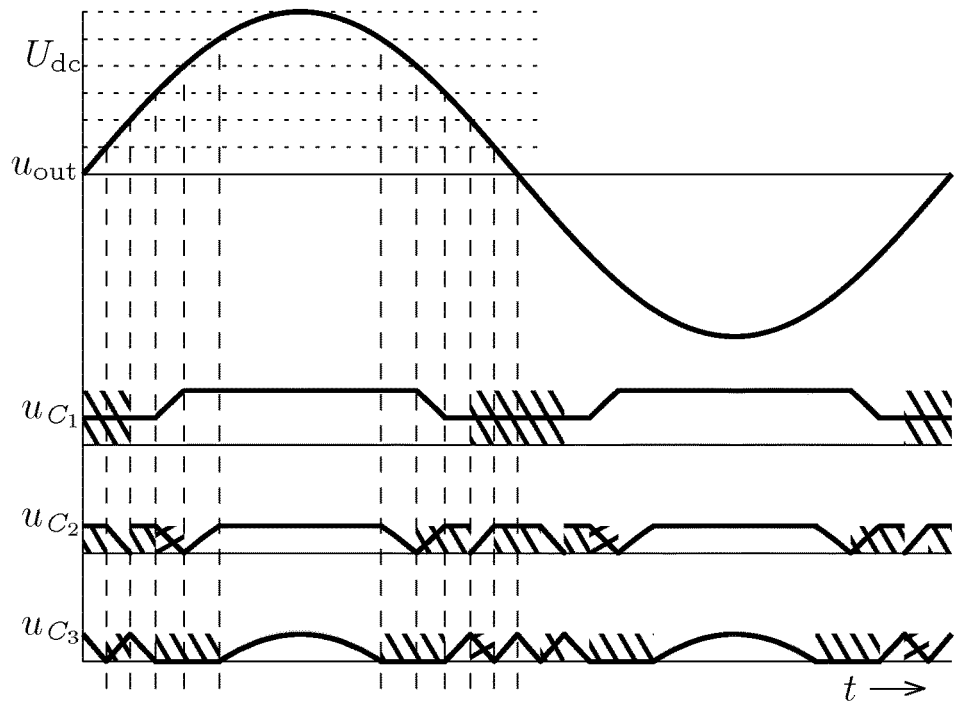
FIG. 24 shows a three-cell converter used to synthesize a sine wave.

The most basic synthesized sine wave is made with a single cell converter. The resulting output signal and capacitor voltage are shown in FIG. 22. Because the bus voltage cannot be controlled there is a flat spot in the generated waveform. In FIG. 23 a two-cell converter is used. The peak voltage on each of the capacitors is equal to $U_{dc}/2$. The hatched areas in the image are where the output voltage is not dependent on the corresponding capacitor voltage. The resulting waveform for a three-cell converter is given on FIG. 24. Note that here $u_{C_2}$ is discontinuous due to the required supply for $C_3$. The peak voltage of C1 is $U_{dc}/2$ and both $C_2$ and $C_3$ have a peak voltage of $U_{dc}/4$.

B. Analysis

The two-cell converter seems ideal for sine wave synthesis as $u_{C_2} \leq u_{C_1}$ at all time instances and there are no discontinuities required in the capacitor voltage. In this section the analysis is made to determine the average and rms inductor current values for difference modulation depths. In FIG. 23 each interval is labeled with the active level at that interval. What is clear form these labels is that l=2 is never active. This level, which is the direct feed-through of the input voltage, cannot be adjusted and can therefore not be used to synthesize the sine wave.

For a given arbitrary reference $u^*_{out}$, and a two-cell ECC based converter with maximum capacitor voltages of $\hat{u}_{C1}$ and $\hat{u}_{C2}$, the level selection per interval is given in Table XI. The maximum output ranges from $-(\hat{u}_{C1}+\hat{u}_{C2})$ to $+(\hat{u}_{C1}+\hat{u}_{C2})$. The corresponding capacitor voltage references are given in Table XII. The voltage references given in square brackets are not contributing to the output but are selected to prevent discontinuities in the reference.

TABLE XI

Two-cell converter level selection per interval

| Interval | l |
|---|---|
| $\hat{u}_{C1} \leq u_{out}^* < \hat{u}_{C1} + \hat{u}_{C2}$ | 4 |
| $U_{dc}/2 \leq u_{out}^* < \hat{u}_{C1}$ | 3 |
| $0 \leq u_{out}^* < U_{dc}/2$ | 1 |
| $-U_{dc}/2 \leq u_{out}^* < 0$ | -1 |
| $-\hat{u}_{C1} \leq u_{out}^* < -U_{dc}/2$ | -3 |
| $-\hat{u}_{C1} - \hat{u}_{C2} \leq u_{out}^* < -\hat{u}_{C1}$ | -4 |

TABLE XII

Two-cell converter capacitor voltage references per level

| l | $u_{C1}^*$ | $u_{C2}^*$ |
|---|---|---|
| 4 | $\hat{u}_{C1}$ | $u_{out}^* - U_{dc}/2 - \hat{u}_{C1}$ |
| 3 | $u_{out}^* - U_{dc}/2$ | [0 V] |
| 2 | — | — |
| 1 | $[U_{dc}/2 - u_{out}^*]$ | $U_{dc}/2 - u_{out}^*$ |
| -1 | $[U_{dc}/2 + u_{out}^*]$ | $U_{dc}/2 + u_{out}^*$ |
| -2 | — | — |
| -3 | $-u_{out}^* - U_{dc}/2$ | [0 V] |
| -4 | $\hat{u}_{C1}$ | $-u_{out}^* - U_{dc}/2 - \hat{u}_{C1}$ |

The invention claimed is:

1. An extended commutation cell (ECC) subcircuit comprising:
   a first port (a), a second port (b), a third port (c) and a fourth port (d);
   a first capacitor connected between the first port (a) and the second port (b);
   a second capacitor connected between the third port (c) and the fourth port (d);
   a first internal node (N1) and a second internal node (N2);
   an inductor connected between the first internal node (N1) and the second internal node (N2);
   a first switch configured to open or close an electrical connection between the first port (a) and the first internal node (N1);
   a second switch configured to open or close an electrical connection between the third port (c) and the first internal node (N1);
   a third switch configured to open or close an electrical connection between the second port (b) and the second internal node (N2);
   a fourth switch configured to open or close an electrical connection between the fourth port (d) and the second internal node (N2).

2. The ECC subcircuit of claim 1, wherein the first switch, the second switch, the third switch and the fourth switch are individually selected from the group consisting of: switches, transistors, metal-oxide-semiconductor field effect transistors, integrated gate-commutated thyristors, and insulated-gate bipolar transistors.

3. The ECC subcircuit of claim 1, wherein a first diode is connected in parallel to the first switch, a second diode is connected in parallel to the second switch, a third diode is connected in parallel to the third switch and a fourth diode is connected in parallel to the fourth switch.

4. The ECC subcircuit of claim 1, further comprising an output circuit to provide a single output from two ports of the ECC subcircuit.

5. An electrical power converter circuit comprising one or more ECC subcircuits as in claim 1 configured to provide multiple output voltage levels.

6. The electrical power converter circuit of claim 5, wherein the one or more ECC subcircuits are connected in cascade, wherein σ is the number of the ECC subcircuits, whereby $2^{\sigma+1}$ output voltage levels can be provided.

7. The electrical power converter circuit of claim 5, further comprising an output circuit to provide a single output from two ports of one of the ECC subcircuits.

8. The electrical power converter circuit of claim 5, wherein the one or more ECC subcircuits are configured as a matrix with both cascaded connections and parallel connections between each column of the matrix, whereby improved fault tolerance is provided.

9. The electrical power converter circuit of claim 5, wherein the multiple output voltage levels are configured to synthesize an analog waveform by control of voltages on the capacitors of the ECC subcircuits.

10. The electrical power conversion circuit of claim 9, wherein the analog waveform is a sinusoid.

11. An extended commutation cell (ECC) subcircuit comprising:
    a first port (a), a second port (b), a third port (c) and a fourth port (d);
    a first capacitor connected between the first port (a) and the second port (b);
    a second capacitor connected between the third port (c) and the fourth port (d);
    a first internal node (N1), a second internal node (N2), and a third internal node (N3);
    an inductor connected between the second internal node (N2) and the third internal node (N3);
    a first switch configured to open or close an electrical connection between the first port (a) and the first internal node (N1);
    a second switch configured to open or close an electrical connection between the third port (c) and the first internal node (N1);
    a third switch configured to open or close an electrical connection between the second port (b) and the second internal node (N2);
    a fourth switch configured to open or close an electrical connection between the fourth port (d) and the second internal node (N2);

a fifth switch configured to open an electrical connection between the first internal node (N1) and the third internal node (N3);

whereby improved fault tolerance is provided.

12. The ECC subcircuit of claim 11, wherein the first switch, the second switch, the third switch, the fourth switch and the fifth switch are individually selected from the group consisting of: switches, transistors, metal-oxide-semiconductor field effect transistors, integrated gate-commutated thyristors, insulated-gate bipolar transistors, relays and fuses.

13. The ECC subcircuit of claim 11, wherein a first diode is connected in parallel to the first switch, a second diode is connected in parallel to the second switch, a third diode is connected in parallel to the third switch and a fourth diode is connected in parallel to the fourth switch.

14. The ECC subcircuit of claim 11, further comprising an output circuit to provide a single output from two ports of the ECC subcircuit.

15. An electrical power converter circuit comprising one or more ECC subcircuits as in claim 11 configured to provide multiple output voltage levels.

16. The electrical power converter circuit of claim 15, wherein the one or more ECC subcircuits are connected in cascade, wherein $\sigma$ is the number of the ECC subcircuits, whereby $2^{\sigma+1}$ output voltage levels can be provided.

17. The electrical power converter circuit of claim 15, further comprising an output circuit to provide a single output from two ports of one of the ECC subcircuits.

18. The electrical power converter circuit of claim 15, wherein the one or more ECC subcircuits are configured as a matrix with both cascaded connections and parallel connections between each column of the matrix, whereby improved fault tolerance is provided.

19. The electrical power converter circuit of claim 15, wherein the multiple output voltage levels are configured to synthesize an analog waveform by control of voltages on the capacitors of the ECC subcircuits.

20. The electrical power conversion circuit of claim 19, wherein the analog waveform is a sinusoid.

* * * * *